(12) United States Patent
Ischdonat et al.

(10) Patent No.: US 10,960,966 B2
(45) Date of Patent: Mar. 30, 2021

(54) CABIN STRUCTURAL COMPONENT, METHOD FOR PRODUCING A CABIN STRUCTURAL COMPONENT, CABIN ASSEMBLY AND TRANSPORT VEHICLE

(71) Applicants: Airbus Defence and Space GmbH, Taufkirchen (DE); Neotech AMT GmbH, Nuremberg (DE)

(72) Inventors: Nils Ischdonat, Hamburg (DE); Patrick Rollfink, Hamburg (DE); Martin Hedges, Nuremberg (DE); Thomas Reitberger, Nuremberg (DE); Daniel Graef, Fuerth (DE); Fabian Reimer, Hamburg (DE)

(73) Assignees: Airbus Defence and Space GmbH; Neotech AMT GmbH

( * ) Notice: Subject to any disclaimer, the term of this patent is extended or adjusted under 35 U.S.C. 154(b) by 561 days.

(21) Appl. No.: 15/784,367

(22) Filed: Oct. 16, 2017

(65) Prior Publication Data
US 2018/0118323 A1 May 3, 2018

(30) Foreign Application Priority Data
Oct. 28, 2016 (DE) .......................... 102016221268.0

(51) Int. Cl.
| | | |
|---|---|---|
| *B64C 1/06* | (2006.01) | |
| *B32B 37/14* | (2006.01) | |
| *B64D 13/08* | (2006.01) | |
| *B64C 1/00* | (2006.01) | |

(52) U.S. Cl.
CPC .............. *B64C 1/066* (2013.01); *B32B 37/14* (2013.01); *B64D 13/08* (2013.01); *B32B 2250/40* (2013.01); *B32B 2307/302* (2013.01); *B32B 2307/304* (2013.01); *B32B 2605/00* (2013.01); *B64C 2001/0072* (2013.01)

(58) Field of Classification Search
CPC B64C 1/066; B64C 1/10; B64C 1/067; B64C 1/18; B64C 1/40; B64C 3/20; B64C 2001/0072
See application file for complete search history.

(56) References Cited

U.S. PATENT DOCUMENTS

| | | | | |
|---|---|---|---|---|
| 3,697,728 | A * | 10/1972 | Stirzenbecher | ........... B64C 1/18 |
| | | | | 219/548 |
| 7,205,510 | B2 | 4/2007 | Howick | |
| 8,575,523 | B2 * | 11/2013 | Chivers | .................... H05B 3/34 |
| | | | | 219/213 |
| 8,952,296 | B2 * | 2/2015 | Hermann | ................ B60R 13/02 |
| | | | | 219/202 |

(Continued)

FOREIGN PATENT DOCUMENTS

| | | |
|---|---|---|
| DE | 100 07 373 C1 | 11/2000 |
| DE | 199 18 736 C2 | 12/2002 |

(Continued)

*Primary Examiner* — Richard G Davis
(74) *Attorney, Agent, or Firm* — Lerner, David, Littenberg, Krumholz & Mentlik, LLP

(57) ABSTRACT

A cabin structural component for a transport vehicle, in particular for an aircraft or spacecraft, has a sandwich structure that has a core and a first cover layer, the first cover layer being provided with a heat conductor that is arranged and designed for heating a cabin wall that can be produced using the cabin structural component.

16 Claims, 9 Drawing Sheets

(56) References Cited

U.S. PATENT DOCUMENTS

| | | | | |
|---|---|---|---|---|
| 10,119,709 B2* | 11/2018 | Dohring | ................ | F24D 13/024 |
| 2012/0234819 A1* | 9/2012 | Berger | ................ | B60H 1/2215 |
| | | | | 219/213 |
| 2015/0195870 A1* | 7/2015 | Chabach | .............. | H05B 3/0014 |
| | | | | 219/507 |
| 2017/0238369 A1* | 8/2017 | Owens | ...................... | B32B 3/12 |
| | | | | 428/116 |
| 2018/0063887 A1* | 3/2018 | Shearer | .................. | B64D 13/08 |
| 2018/0094434 A1* | 4/2018 | Gillissen | ................ | H01C 7/027 |

FOREIGN PATENT DOCUMENTS

| | | |
|---|---|---|
| DE | 11 2005 000 939 T5 | 7/2007 |
| DE | 10 2015 005 945 B3 | 8/2016 |

* cited by examiner

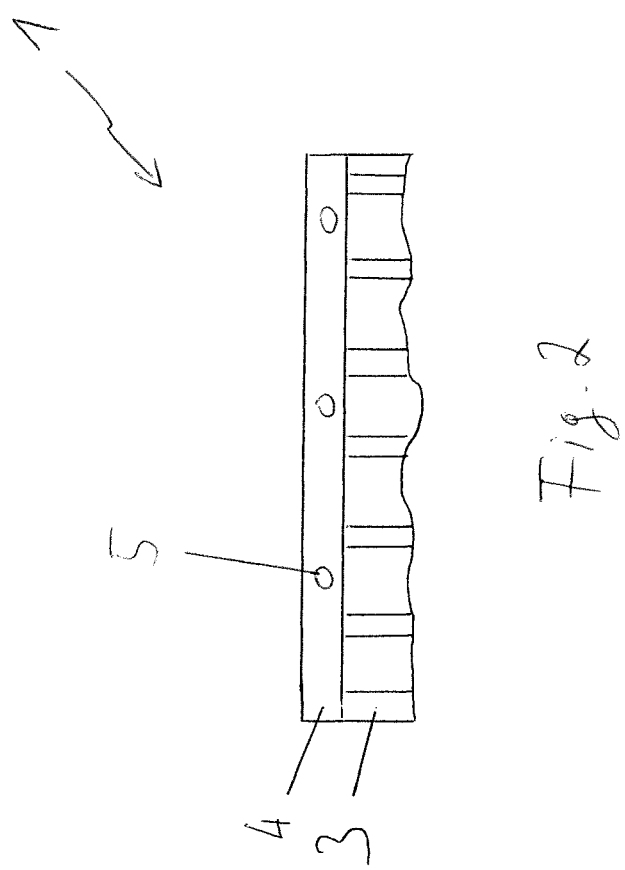

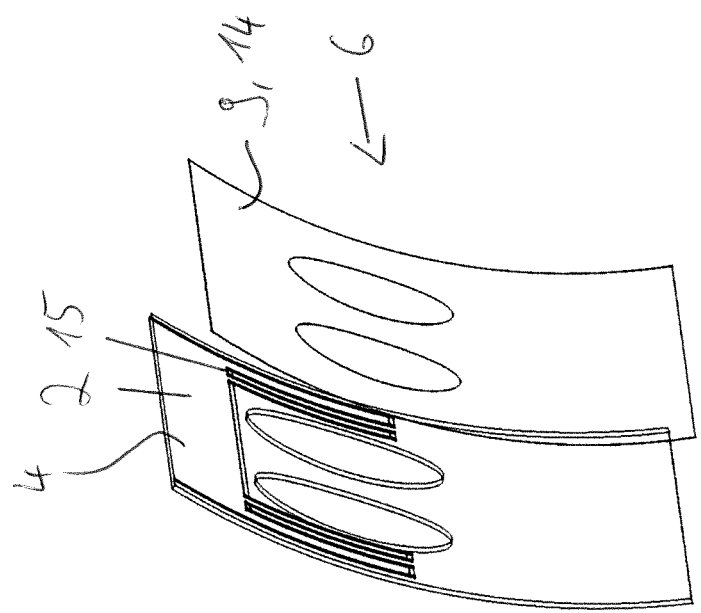
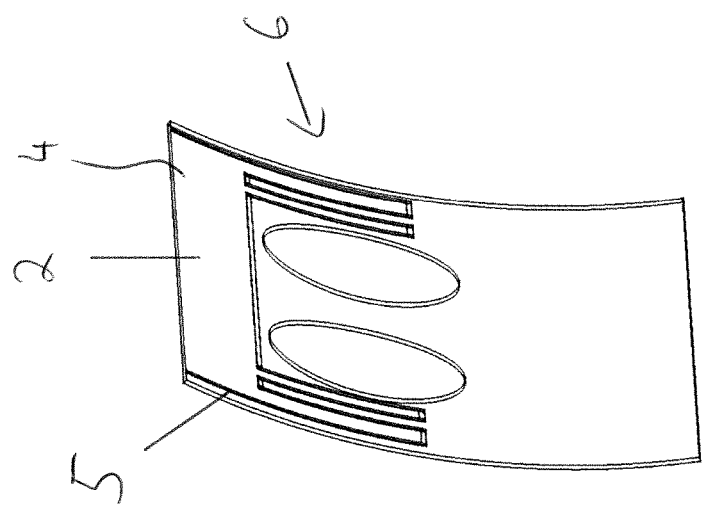
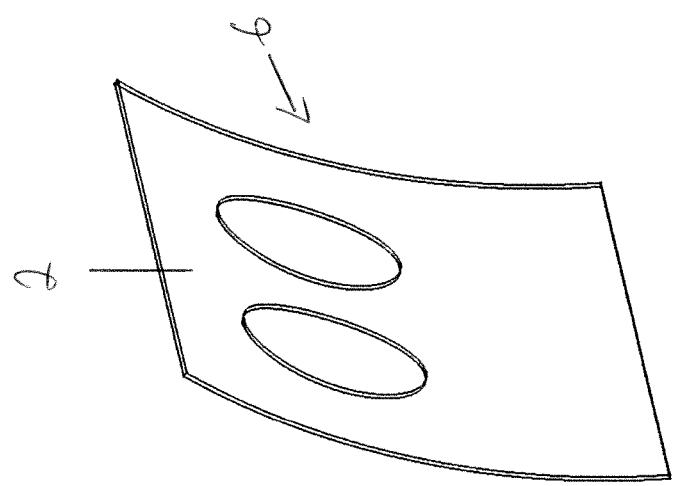

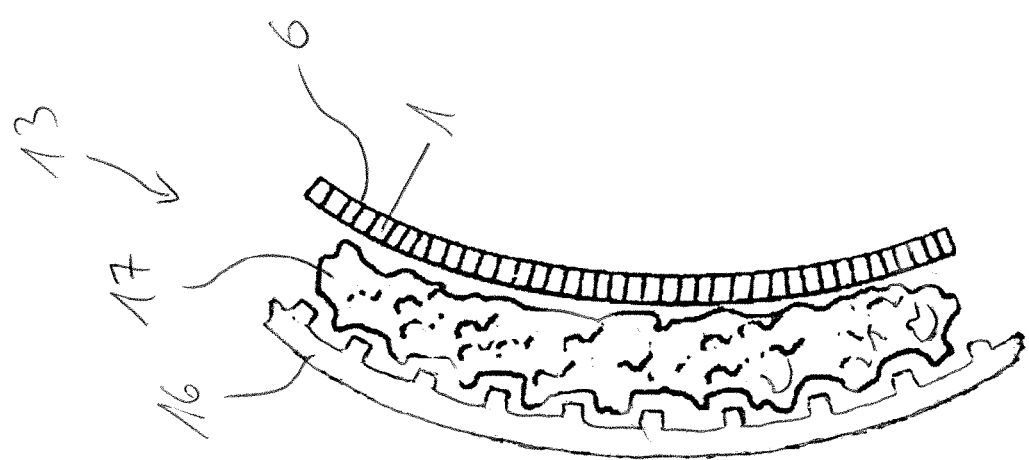

CABIN STRUCTURAL COMPONENT, METHOD FOR PRODUCING A CABIN STRUCTURAL COMPONENT, CABIN ASSEMBLY AND TRANSPORT VEHICLE

FIELD OF THE INVENTION

The present invention relates to a cabin structural component, to a method for producing a cabin structural component, to a cabin assembly comprising a cabin structural component of this kind, and to a transport vehicle comprising a cabin assembly of this kind.

Although applicable to any transport vehicle, the present invention and the problem on which it is based will be explained in detail in the following with reference to an aircraft or spacecraft.

BACKGROUND OF THE INVENTION

Fibre composite materials in a sandwich construction are often used in structural components for cabins, for example in the casing elements forming a cabin wall. Said materials are characterised by high rigidity at a simultaneously low weight. DE 100 07 373 C1 for example describes a corresponding sandwich component.

In a cabin assembly for an aircraft or spacecraft, a conventional wall structure of a cabin assembly consists of the primary structure of the aircraft that forms an outer shell, the casing elements in a sandwich construction, and an insulation layer that is arranged between the primary structure and the casing elements and is usually formed having glass wool insulation. In this case, the glass wool insulation has inter alia a thermal role, in particular in order to increase the comfort for the passengers in the cabin. For example, the glass wool insulation vehicle that heat can be stored for longer in the aircraft cabin, and that the aircraft cabin is insulated from the cold surroundings present at cruising altitude.

Typically, some degree of lateral spacing is also provided between casing elements and a passenger seat, in order to prevent the passenger from being in direct contact with the colder cabin wall or the casing element and to thus increase comfort.

BRIEF SUMMARY OF THE INVENTION

Against this background, it is an idea of the present invention to provide an improved cabin structural component for or in a transport vehicle.

The following is accordingly provided:

a cabin structural component for a transport vehicle, in particular for an aircraft or spacecraft, comprising a sandwich structure that has a core and a first cover layer, the first cover layer being provided with a heat conductor that is arranged and designed for heating a cabin wall that can be produced using the cabin structural component.

a method for producing a cabin structural component, in particular a cabin structural component according to the invention, comprising the following method steps: providing a core that is suitable for a sandwich structure, and a first cover layer; applying the first cover layer to the core in order to form a sandwich structure; applying a heat conductor to an outer face of the first cover layer that faces away from the core; and applying an insulation layer to the outer face of the first cover layer that faces away from the core, which insulation layer insulates the heat conductor.

a method for producing a cabin structural component, in particular a cabin structural component according to the invention, comprising the following method steps: providing a core that is suitable for a sandwich structure and a first cover layer; providing the first cover layer with a heat conductor; and applying the first cover layer provided with the heat conductor to the core.

a cabin assembly for a transport vehicle, in particular for an aircraft or spacecraft, the cabin assembly comprising a cabin structural component according to the invention and/or a cabin structural component produced according to a method according to the invention, and the cabin structural component forming a cabin wall.

a transport vehicle, in particular an aircraft or spacecraft, comprising a cabin that comprises a cabin assembly according to the invention.

The concept on which the present invention is based consists in providing the cabin-side cover layer of a cabin structural component, from which a cabin wall can be produced or is formed, with heat conductors for heating the cabin wall, in order to improve the comfort and use of space in a cabin.

A heat conductor that is integrated into a cabin structural component in this manner can accordingly be used as an active heating element and in particular can be used anywhere in the field of transportation where sandwich composites made of fibre composite materials are used as casing elements. The use thereof is particularly advantageous in fields in which the outer climatic conditions and corresponding cold bridges result in discomfort in the region of the casing elements, on account of cold surfaces. The applied or integrated heat conductors heat the otherwise cold surface of the cabin wall. In particular what is known as the "cold shoulder" phenomenon is thus prevented in the case of passenger seats positioned in the region of the cabin wall, which phenomenon passengers can otherwise experience on account of the cold surfaces in the case of passenger seats positioned in the region of the cabin wall. The travel comfort is thus advantageously increased according to the invention.

The solution according to an embodiment of the invention can be implemented in aviation on account of the low ambient temperature at cruising altitude of approximately −50° C. The low ambient temperature at cruising altitude causes the components in contact with the primary structure of the aircraft, for example the cabin walls of the aircraft cabin formed by the sandwich elements, to cool. In the process, the cabin walls also emit the cold into the nearby surroundings. Discomfort which is possible as a result, in particular in the form of what is known as a "cold shoulder", is prevented according to an embodiment of the invention.

This can also be transferred in the same manner to other transport vehicle, for example rail transport, in particular at cold times of year.

In addition, according to an embodiment of the invention it is not necessary to provide an increased spacing between the cabin wall and the passenger seat. In this way, the space available in the cabin can be optimally used for seating. In particular, more passenger seats can be arranged inside the cabin, and thus for example a maximum occupancy or seat design can be made use of effectively. The cost-effectiveness of the transport vehicle is thus increased.

According to an embodiment of the invention the presence of the heat conductors also makes it possible to reduce the thickness of an insulation layer between the primary structure and the cabin structural part, for example the amount of glass wool insulation required. In particular, the heat conductors applied to the sandwich structure can assume the thermal roles of the glass wool insulation in part. Advantageously, a smaller installation space is thus required for the insulation. Furthermore, the weight of the insulation can thus advantageously be reduced in part. An aspect of the invention thus contributes to a lower weight of a transport vehicle, and this reduces energy consumption.

For the purpose of production, the first cover layer can be applied to the core and the heat conductor subsequently applied to the cover layer. Alternatively, however, the first cover layer can already be provided with a heat conductor when still a semi-finished product and only then, i.e. together with the heat conductor, be applied to the core.

There are many varied options for applying the heat conductor to the first cover layer and/or for providing the first cover layer with a heat conductor.

According to one embodiment of the cabin structural component, the heat conductor is designed as a positive temperature coefficient resistor element. In particular, in this case the heat conductor is designed for self-regulating heating of the cabin wall. Since a cabin temperature should in general be approximately constant, the positive temperature coefficient resistor, in particular on account of the chemical composition thereof, can be designed from the outset to be self-regulating to a specified temperature. External regulation of the heat output is thus advantageously not required. Furthermore, a control unit or fuse is advantageously not required, which unit or fuse usually prevents burn out in standard applications of heat conductors.

In one embodiment, what are known as PTC inks (PTC: positive temperature coefficient) can be used as printed positive coefficient resistors. Inks of this kind have a positive temperature coefficient and are thus self-regulating when used as heat conductors. During operation, the temperature thereof thus does not exceed a limit specified by the design and/or the material selection. The heat conductor is thus prevented from burning out. This is particularly advantageous in terms of safety aspects, in particular in aviation.

According to one embodiment, the heat conductor is provided on an inner face of the first cover layer that faces the core. Advantageously, additional insulation is thus not required, since the heat conductor is already insulated from the outside by the outer cover layer.

Alternatively or in addition, in one embodiment the heat conductor is provided on an outer face of the first cover layer that faces away from the core. This is advantageous in that the heat conductor can be easily applied to the outside of the finished sandwich element. Simple production is thus possible. In this case, an insulation layer that insulates the heat conductor from the outside can be provided.

According to a further embodiment, the heat conductor is printed on the first cover layer. In this case, the printing technology used can advantageously be applied in a manner adapted to the heat output required and to the material properties of the first cover layer. Relevant properties of the first cover layer can, for example, be the roughness or surface topology, the dielectric properties, the moisture absorption and/or the thermal expansion of the material. The geometry of the heat conductor can also be flexibly adapted in the case of printed heat conductors. Overall, this makes possible a very flexible production process for producing the heat conductor.

In one embodiment, it is also possible to selectively adapt the properties of the first cover layer to the requirements of the printing technology used in each case for producing the heat conductor, for example by optimising a resin system contained in the first cover layer. For example ink-jet printing methods, such as "drop-on-demand" and "aerosol jet printing", are possible as usable printing technology.

According to another embodiment, the heat conductor is integrated into the first cover layer. In this case, a very wide range of types of integration are conceivable. For example, the heat conductors can be integrated into the top cover layer in the form of heating wires. Advantageously, a prefabricated first cover layer comprising an already integrated heat conductor can thus be provided, and therefore the heat conductor is already integrated when the sandwich structure is being produced. Advantageously, in this case downstream steps for applying the heat conductor are no longer required. In general, additional insulation is advantageously no longer required either.

A heat conductor can be provided in integrated form in a wide variety of ways. In the case of a fibre composite material of the first cover layer, it is conceivable, for example, to already insert the heat conductor in a fibre layer or a fibrous tissue, or to apply said conductor thereto and to subsequently carry out resin infusion. Alternatively or in addition, subsequent integration is also conceivable.

According to one embodiment, the first cover layer contains a polymer into which the heat conductor is integrally cast or laminated. Advantageously, the heat conductor is thus directly insulated from the outside by the adjacent polymer layer. Additional insulation of the heat conductor can thus be omitted and/or need not be specifically taken into account.

According to another embodiment, the heat conductor is adhesively bonded to the first cover layer. In particular, the heat conductor can be applied particularly easily in this manner, for example in the form of a heat conductor that is prefabricated on a base material and provided with an adhesive layer. Moreover, a heat conductor available as bulk stock can also be easily applied in a particularly economical manner by vehicle of adhesive bonding.

According to one embodiment of the method for producing a cabin structural component, the heat conductor is applied to the inner face that faces the core.

Alternatively or in addition, in a further embodiment the heat conductor is applied to the outer face that faces away from the core.

According to a further development, the heat conductor is printed on the first cover layer.

According to another embodiment, the heat conductor can also be adhesively bonded.

According to one embodiment, the heat conductor is embedded in a matrix material of the first cover layer. In particular, it is embedded such that the heat conductor is completely covered by the matrix material. The embedding can comprise impregnation or lamination for example.

The material of the first cover layer can in particular be a fibre composite material. For example, it may be an already infiltrated fibre composite material or a dry fibre layer that is infiltrated when the heat conductor is embedded.

A method for producing the cover layer for a cabin structural component, in particular for a cabin structural component according to the invention, accordingly comprises for example the following method steps: providing a heat conductor; arranging the heat conductor in a planar arrangement, in particular on a material provided for forming the cover layer; embedding the heat conductor in a matrix material, the heat conductor being completely covered by the matrix material.

In one embodiment, a step of curing the matrix material may be provided.

In another embodiment, the curing can also initially be postponed or carried out only in part. In this case, the matrix material can later act as an adhesion promoter between the core and the first cover layer. Accordingly, the matrix material is cured only when the first cover layer is applied to the core. Advantageously, an additional adhesion promoter is thus not required for the connection between the first cover layer and the core.

According to one embodiment of a cabin assembly, a decorative film is applied to the first cover layer, which film is designed as an insulating layer and is arranged so as to insulate the heat conductor. This advantageously provides a functional integration of the decorative film. In particular, the decorative film which is in any case usually provided on a cabin wall acquires an additional function.

The above embodiments and developments can be combined together in any meaningful manner. In particular, all the features of a cabin structural component and the properties and advantages thereof can be transferred to a method for producing the cabin structural component, and vice versa.

Further possible embodiments, developments and uses of the invention also include combinations of features of the invention described previously or below with respect to the embodiments, even if not explicitly specified. In particular, a person skilled in the art will also add individual aspects as improvements or supplements to the respective basic forms of the present invention.

BRIEF DESCRIPTION OF THE DRAWINGS

In the following, the present invention is described in greater detail by way of the embodiments specified in the schematic drawings, in which:

FIG. 2 is a schematic view of the structure of a cabin structural component according to another embodiment;

FIG. 4A-4C are schematic views of steps for producing a cabin wall for a cabin assembly;

FIG. 5 is a schematic cross-section of the structure of a cabin assembly;

Figure 1:
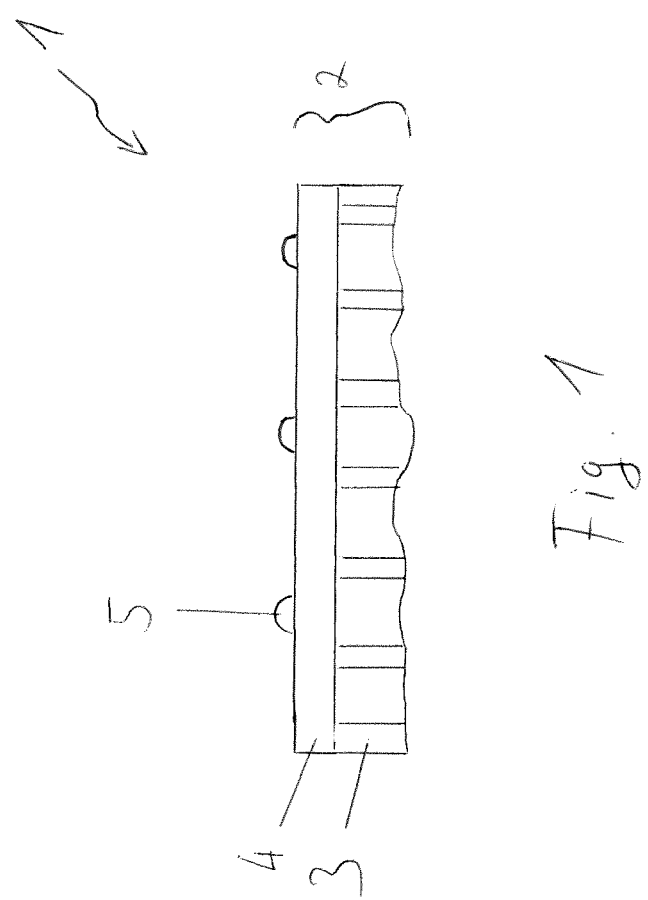
FIG. 1 is a schematic view of the structure of a cabin structural component.

The accompanying drawings are intended to provide further understanding of the embodiments of the invention. They illustrate embodiments and, together with the description, they serve to explain principles and concepts of the invention. Other embodiments and many of the advantages mentioned are clear with regard to the drawings. The elements of the drawings are not necessarily shown true to scale relative to one another.

In the figures of the drawings, identical, functionally identical and identically operating elements, features and components have been respectively provided with the same reference numerals, unless indicated otherwise.

DETAILED DESCRIPTION OF EMBODIMENTS

FIG. 1 is a schematic view of the structure of a cabin structural component.

The cabin structural component 1 has a sandwich structure 2 comprising a core 3 and a first cover layer 4. The cabin structural component 1, in particular the sandwich structure 2 thereof, can comprise further elements and/or layers, for example a second cover layer arranged on a face opposite the first cover layer, which elements and/or layers are not shown here for the purpose of improved clarity.

The first cover layer 4 is provided with a heat conductor 5 that is designed for heating a cabin wall 6 that can be produced using the cabin structural component 1. In the embodiment shown here, this is a heat conductor 5 that is arranged on an outer face 8 of the first cover layer 4 that faces away from the core 3.

In the embodiment shown, the heat conductor 5 is printed on the first cover layer 4. In other embodiments, the heat conductor can also be applied to the first cover layer 4 in another manner, for example adhesively bonded.

The first cover layer 4 is formed of a fibre-reinforced plastics material or of a pure plastics material for example.

The printing technology used for printing the heat conductor 5 is selected depending on the required heat output and the material properties of the first cover layer 4. For example, a "drop-on-demand" or an "aerosol jet printing" method can be used.

The properties of the first cover layer 4 can also be selectively adapted to the requirements of the printing technology used, for example by optimising the resin system of a plastics material used therefor.

FIG. 2 is a schematic view of the structure of a cabin structural component 1 according to another embodiment.

Differently from the embodiment according to FIG. 1, in this case the heat conductors 5 are integrated into the first cover layer 4. For example, the heat conductors 5 can be embedded in a resin contained in the top cover layer 4, in the form of heating wires. In this way, the heat conductors are also directly insulated from the outside by means of the resin.

Figure 3C:
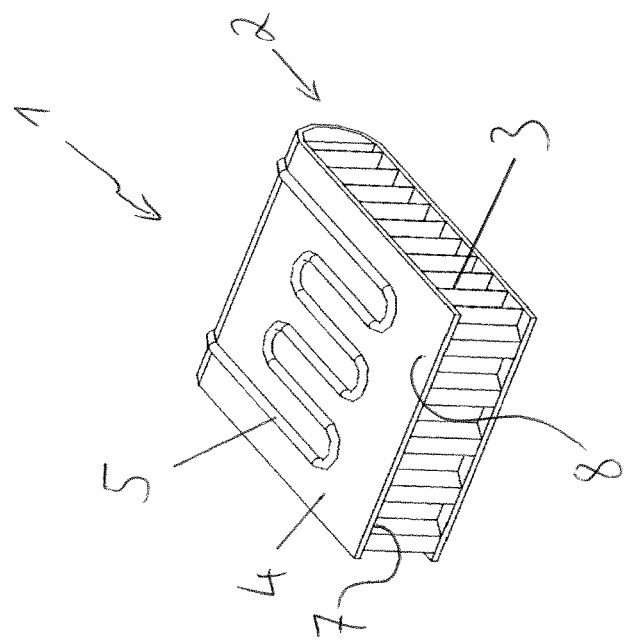
FIG. 3A-3C are schematic views of steps for producing a cabin structural component.
Figure 3B:
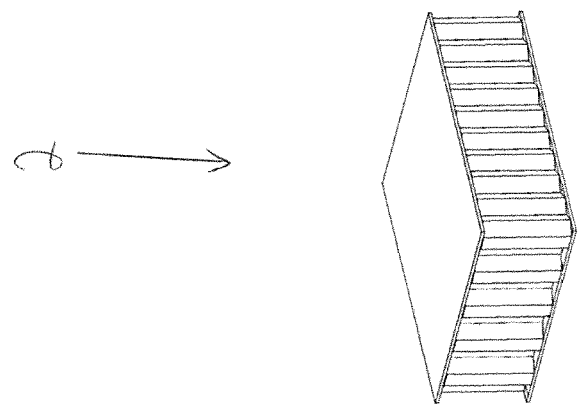
Figure 3A:
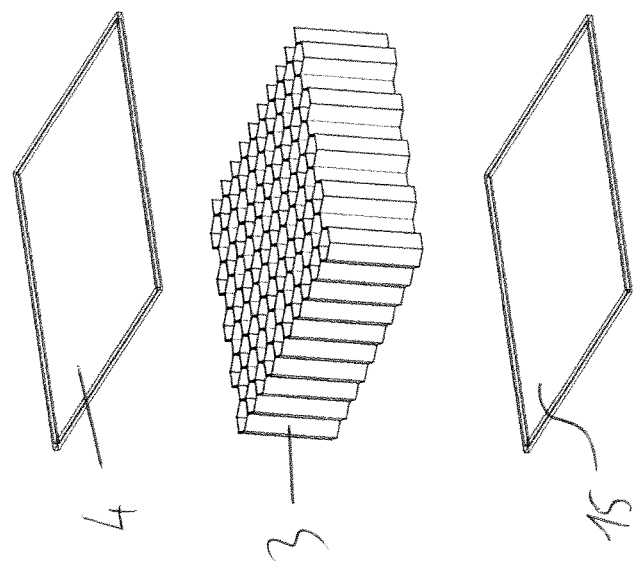

FIG. 3A-3C are schematic views of steps for producing a cabin structural component 1.

FIG. 3A shows the provision of a core 3 suitable for a sandwich structure, and a first cover layer 4.

In the embodiment shown, the core 3 is, by way of example, an open-pored core that is formed having a honeycomb structure. In other embodiments, other cores suitable for sandwich structures, for example a foam core, a core having a box structure, or the like, can also be used.

The first cover layer 4 is a planar formation that comprises a fibre composite material or a pure plastics material for example.

The first cover layer 4 can be coated with an adhesion promoter on the face thereof that faces the core 3, which adhesion promoter is provided for a material-uniting connection between the first cover layer 4 and the core on the open-pored end face thereof. This may be a thermosetting resin for example, which is curable in order to produce a material-uniting connection.

Furthermore, a second cover layer 15 is provided in the embodiment shown. Said second cover layer is in particular designed so as to be identical to the first cover layer and is likewise provided with an adhesion promoter for material-uniting connection to the core. The second cover layer 15 is provided for application to a further open-pored end face of the core 3 that faces away from the first cover layer 4.

FIG. 3B shows a sandwich structure 2 that is formed by application of the first cover layer 4 to the core 3, and by opposing application of the second cover layer 15 to the core 3 and curing of the adhesion promoter. Such a connection of a sandwich structure is known to a person skilled in the art, and is therefore not described in more detail here.

FIG. 3C shows the cabin structural component, a heat conductor 5 being applied to the first cover layer 4. In particular, the heat conductor 5 is applied in the manner described in relation to FIG. 1.

The first cover layer 4 comprises a inner face 7 that faces the core 3 and an outer face 8 that faces away from the core 3, the heat conductor 5 being provided on the outer face 8 of the first cover layer 4.

The heat conductor 5 extends in a meandering manner on the outer face 8 and thus forms a planar heating element. Said heat conductor is thus arranged so as to heat a cabin wall 6 that can be produced using the cabin structural component 1.

In other embodiments, other planar arrangements of the heat conductor 5 that are suitable for heating a cabin wall 6 are also possible.

FIG. 4A-4C are schematic views of steps for producing a cabin wall for a cabin assembly.

FIG. 4A shows a cabin structural component 1 that is designed as a cabin wall 6 and is formed by a sandwich structure 2.

FIG. 4B shows the cabin structural component 1 according to FIG. 4A, a heat conductor 5 being applied to the first cover layer 4 of the sandwich structure in the manner described in relation to FIG. 3C and FIG. 1. The heat conductor 5 can therefore be printed on the first cover layer 4. In other embodiments, the heat conductor 5 can also be adhesively bonded to the first cover layer 4.

In order to produce the printed heat conductor, what are known as PTC inks, which are marketed for example by the company Henkel under the designation "LOCTITE ECI 8000", can be printed onto the first cover layer 4 by means of a suitable printing method, for example drop-on-demand or aerosol jet printing.

Insulation of the printed heat conductor 5 can subsequently be provided, for example by means of an insulating layer 9.

FIG. 4C shows the cabin structural component 1 according to FIG. 4B, an insulating layer 9 for insulating the heat conductor 5 being applied to the first cover layer 4.

The insulating layer 9 is a decorative film 14 that is usually applied to a sandwich structure 2 that forms a cabin wall 6. In the embodiment shown, the decorative film is applied to the entire outer face 8 of the first cover layer 4, so as to completely cover the heat conductor 5.

In this case, the decorative film 14 therefore acquires a further function of insulating the heat conductor 5, in addition to providing a look and feel that is suitable for a cabin wall 6.

In other embodiments, the insulating layer 9 may also be an insulating layer 9 provided instead of a decorative film 14 or in addition to a decorative film 14.

FIG. 5 is a schematic cross-section of the structure of a cabin assembly 13.

The cabin assembly 13 comprises a primary structure 16 that forms the outer shell of a transport vehicle 10, and a cabin wall 6, in particular formed by the cabin structural component 1 according to FIG. 4C. An insulation layer 17 is arranged between the primary structure 16 and the cabin structural component 1. In this case, the insulation layer is glass wool insulation for example.

On account of the heat conductor 5 (not shown here for the sake of improved clarity) provided on the cabin wall 6 and/or on the first cover layer 4 of the sandwich structure 2, the insulation layer 17 can be made thinner compared with conventional cabin assemblies.

In order to generate a power supply, the heat conductors 5 are connected to the power supply system of the transport vehicle 10 in question during assembly of a cabin wall 6.

Figure 6:
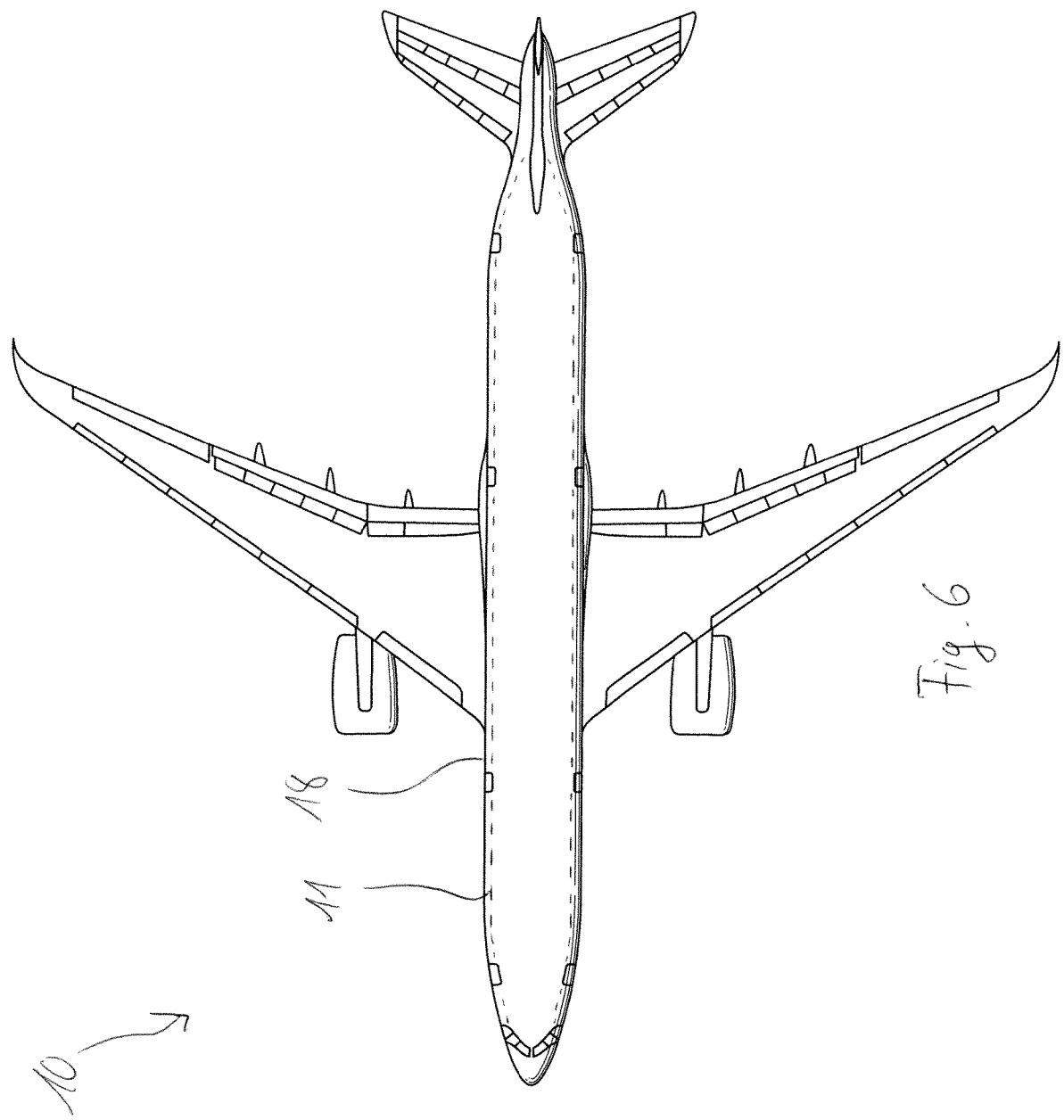
FIG. 6 is a schematic plan view of an aircraft or spacecraft.

FIG. 6 is a plan view of an aircraft or spacecraft 10.

In the embodiment shown, the aircraft or spacecraft 10 is a passenger aircraft. Said aircraft comprises a fuselage 18, over which a cabin 11 (indicated by dashed lines in the plan view shown) extends.

The cabin 11 is designed having a cabin assembly 13 as described in relation to FIG. 5, and accordingly comprises, in the fuselage 11, a cabin structural component 1 according to FIG. 4C that forms the cabin wall 6.

Figure 7A:
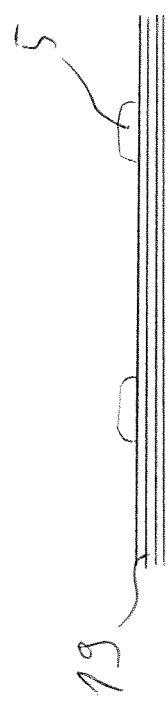
FIG. 7A, 7B are schematic views of steps for producing a cover layer for a cabin structural component.
Figure 7B:
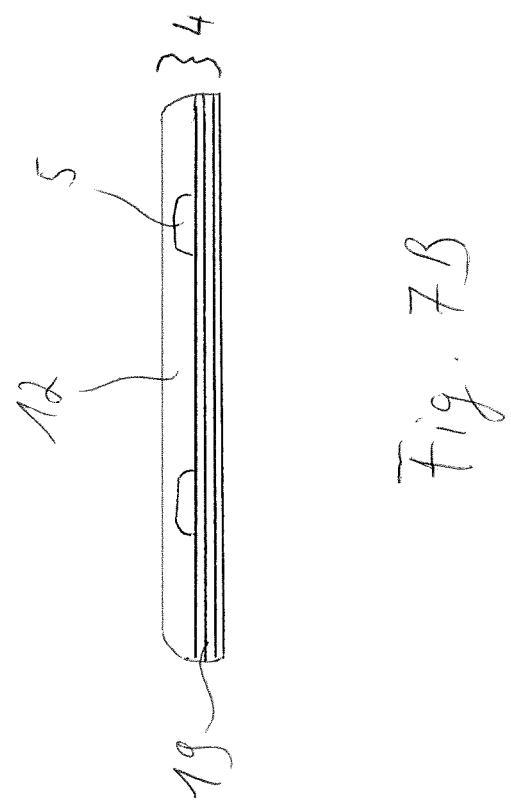

FIGS. 7A and 7B are schematic views of steps for producing a cover layer 4 for a cabin structural component 1 according to another embodiment.

FIG. 7A shows the provision of a heat conductor 5, the heat conductor 5 being applied in a planar arrangement to a material 19 provided for forming the cover layer 4.

The material 19 provided for forming the cover layer 4 is fibre layers for example, which are provided for forming a first cover layer 4 formed as a fibre composite layer. In other embodiments, said material can also be a prepreg or an already cured fibre composite layer. Moreover, in another embodiment, said material can also be a pure plastics material layer.

The heat conductor 5 can be provided in the form of a heating wire formed as bulk stock for example, and be arranged on the material 19 in a planar manner. For example, said conductor can be arranged in a planar manner, in a uniformly meandering arrangement. In other embodiments, other arrangements suitable for heating a cabin wall are also possible.

In another embodiment, it is also possible to apply said heat conductor in a prefabricated form, for example adhesively bonded in a suitable arrangement on a base material.

FIG. 7B shows the heat conductor 5 and the material 19 according to FIG. 7A, said conductor and material being embedded in a matrix material 12 in order to form a first cover layer 4.

A resin, in particular, can be used for embedding in a matrix material 12, for which purpose for example vacuum infusion of the assembly according to FIG. 7A is carried out. Furthermore, in other embodiments it is conceivable to integrally cast or to laminate the heat conductor 5 into a matrix material 12 of the first cover layer 4.

The matrix material 12 of the cover layer 4 can be cured or cured in part following the embedding process. In this case, the cover layer 4 is subsequently provided with an adhesion promoter and can then be applied to the core 3 in order to form a sandwich structure 2, as described in relation to FIGS. 3A and 3B.

In another embodiment, the cover layer 4 can be applied directly to the core 3 when not yet cured and/or when wet, so that the matrix material 12 wets the end face of the core 3 in the form of a liquid resin. An additional adhesion promoter is not required in this case. Instead, the connection between the first cover layer 4 and the core 3 can be produced by curing the matrix material 12 that is in contact with the core 3.

Figure 8:
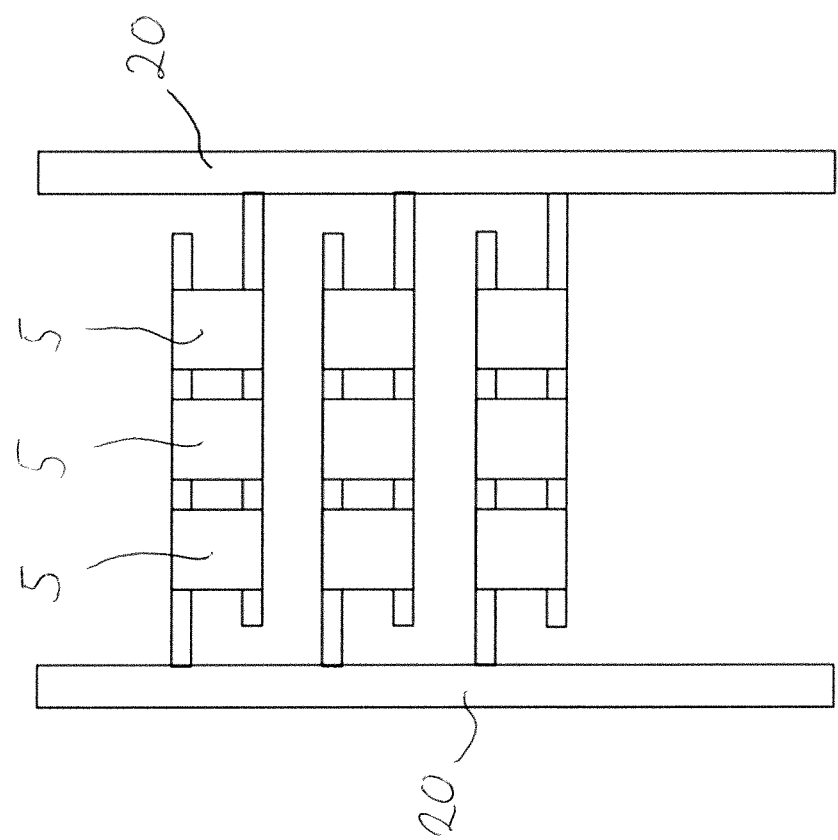
FIG. 8 shows an assembly of heat conductors.

FIG. 8 shows an assembly of heat conductors 5.

In this case, this is an embodiment in which a combination of metal contact conductors 20 and heat conductors 5 that are arranged therebetween and contacted by means of the metal contact conductors 20, which heat conductors are formed as PTC heating elements.

In particular, both the metal contact conductors 20 and the heat conductors 5 (PTC elements) are conductor structures that are printed on the first cover layer 4 (not shown here) and can be provided as an alternative or optionally also in addition to the heat conductors 5 provided in FIGS. 1 to 4.

The contact conductors 20 form regularly arranged webs, between which the heat conductors 5, formed as PTC elements, are arranged and contacted thereby.

A resistance of the PTC elements can be many times greater than the resistance of the metal contact conductors 20. Therefore, only the PTC heating elements emit a heat output and accordingly function as heat conductors 5.

The metal contact conductors 20 are used primarily for electrically contacting the heat conductor 5 formed as PTC elements and, on account of the lower resistance of said contact conductors, themselves cause no or only negligible heat output.

In one embodiment, when suitably designed and arranged, the contact conductors 20 can additionally contribute to the uniform planar distribution over the first cover layer 4 of the thermal heat generated by the heat conductors 5.

Although the present invention has been described in full in the above with reference to several embodiments, it is not limited thereto, but can be modified in various ways.

In particular, a transport vehicle in which the cabin assembly 13 and/or the cabin structural component 1 is used may also be a ground vehicle, in particular a rail vehicle or road vehicle.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A cabin structural component for a transport vehicle, comprising:
   a sandwich structure having a core and a first cover layer,
   wherein the first cover layer comprises a heat conductor arranged and configured for heating a cabin wall produced using the cabin structural component,
   wherein the heat conductor comprises a positive temperature coefficient resistor element, and
   wherein the heat conductor is in the form of a heating wire.

2. The cabin structural component of claim 1, wherein the heat conductor is provided on at least one of an inner face of the first cover layer that faces the core, and an outer face of the first cover layer that faces away from the core.

3. The cabin structural component of claim 1, wherein the heat conductor is printed on the first cover layer.

4. The cabin structural component of claim 1, wherein the heat conductor is integrated into the first cover layer.

5. The cabin structural component of claim 4, wherein the first cover layer contains a polymer in which the heat conductor is embedded.

6. The cabin structural component of claim 1, wherein the heat conductor is adhesively bonded to the first cover layer.

7. A cabin assembly for a transport vehicle, wherein the cabin assembly comprises:
   a cabin structural component according to claim 1,
   wherein the cabin structural component forms the cabin wall.

8. The cabin assembly of claim 7, further comprising a decorative film applied to the first cover layer, the decorative film being configured as an insulating layer and arranged so as to insulate the heat conductor.

9. A transport vehicle, comprising a cabin that comprises a cabin assembly according to claim 7.

10. A cabin structural component for a transport vehicle, comprising:
    a sandwich structure having a core and a first cover layer,
    wherein the first cover layer comprises a heat conductor arranged and configured for heating a cabin wall produced using the cabin structural component,
    wherein the heat conductor comprises a positive temperature coefficient resistor element,
    wherein the first cover layer comprises a plurality of metal contact conductors, and
    wherein the heat conductor comprises a plurality of heat conductors arranged between and contacted by the plurality of metal contact conductors.

11. The cabin structural component of claim 10, wherein the heat conductor is provided on at least one of an inner face of the first cover layer that faces the core, and an outer face of the first cover layer that faces away from the core.

12. The cabin structural component of claim 10, wherein the heat conductor is printed on the first cover layer.

13. The cabin structural component of claim 10, wherein the heat conductor is integrated into the first cover layer.

14. The cabin structural component of claim 13, wherein the first cover layer contains a polymer in which the heat conductor is embedded.

15. The cabin structural component of claim 10, wherein the heat conductor is adhesively bonded to the first cover layer.

16. A cabin assembly for a transport vehicle, wherein the cabin assembly comprises:
    a cabin structural component according to claim 10,
    wherein the cabin structural component forms the cabin wall.

* * * * *